(12) United States Patent
Parfitt et al.

(10) Patent No.: US 11,867,977 B2
(45) Date of Patent: Jan. 9, 2024

(54) BATTERY POWERED WEARABLES

(71) Applicant: Eaton Intelligent Power Limited, Dublin (IE)

(72) Inventors: Stewart John Parfitt, England (GB); James A. Cooke, Wales (GB); Peter Rigling, Herts (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 611 days.

(21) Appl. No.: 16/825,866

(22) Filed: Mar. 20, 2020

(65) Prior Publication Data
US 2020/0301173 A1 Sep. 24, 2020

(30) Foreign Application Priority Data
Mar. 22, 2019 (GB) ..................................... 1904002

(51) Int. Cl.
*H02J 7/34* (2006.01)
*G02C 11/00* (2006.01)
*H02J 7/00* (2006.01)

(52) U.S. Cl.
CPC ............ *G02C 11/10* (2013.01); *H02J 7/0013* (2013.01); *H02J 7/0042* (2013.01)

(58) Field of Classification Search
CPC ....... G02C 11/10; H02J 7/0013; H02J 7/0042; H02J 7/0045; H02J 7/0024; H02J 7/0025
USPC ......................................................... 351/41
See application file for complete search history.

(56) References Cited

U.S. PATENT DOCUMENTS

| | | | | |
|---|---|---|---|---|
| 6,899,539 B1* | 5/2005 | Stallman | ................. | F41H 13/00 345/157 |
| 9,690,119 B2* | 6/2017 | Garofolo | ................. | G03B 15/14 |
| 10,754,380 B2* | 8/2020 | Pennington, Jr. | ....... | G06F 1/163 |
| 2010/0264738 A1* | 10/2010 | Murtha | ................. | H02J 7/0025 307/66 |
| 2012/0120636 A1* | 5/2012 | Wilt | .................... | F21V 33/0004 362/105 |
| 2012/0235887 A1* | 9/2012 | Border | ................... | G06Q 30/02 345/8 |
| 2013/0044042 A1* | 2/2013 | Olsson | ............... | G02B 27/0176 345/8 |
| 2013/0235331 A1* | 9/2013 | Heinrich | ................. | G02C 11/10 351/158 |
| 2014/0028968 A1* | 1/2014 | Olsson | ............... | G02B 27/0149 362/23.05 |
| 2014/0132484 A1* | 5/2014 | Pandey | ................. | G02B 27/017 345/8 |
| 2014/0306662 A1* | 10/2014 | Kim | ...................... | H02J 7/0016 320/118 |
| 2015/0309316 A1* | 10/2015 | Osterhout | ............. | G06F 3/0488 345/8 |
| 2017/0093151 A1* | 3/2017 | Givelin | .................. | H02H 9/045 |
| 2018/0120897 A1* | 5/2018 | Smit | .................... | G06F 1/1628 |
| 2018/0338119 A1* | 11/2018 | Hoffman | ............ | H04N 21/2187 |
| 2019/0069154 A1* | 2/2019 | Booth | ..................... | H04W 4/90 |
| 2019/0341951 A1* | 11/2019 | Grifoni | .............. | H04M 1/0262 |
| 2020/0140087 A1* | 5/2020 | Fulbright | ................ | B64D 1/16 |
| 2021/0022599 A1* | 1/2021 | Freeman | ................ | G16H 10/60 |

* cited by examiner

Primary Examiner — Ryan Jager
(74) Attorney, Agent, or Firm — Stinson LLP

(57) ABSTRACT

The present invention provides for an intrinsically safe powered wearable device including a power source connector for physical and electrical connection and disconnection for replacement of a power source on the device in a hot-pluggable manner.

13 Claims, 1 Drawing Sheet

Zone 1

Zone 1
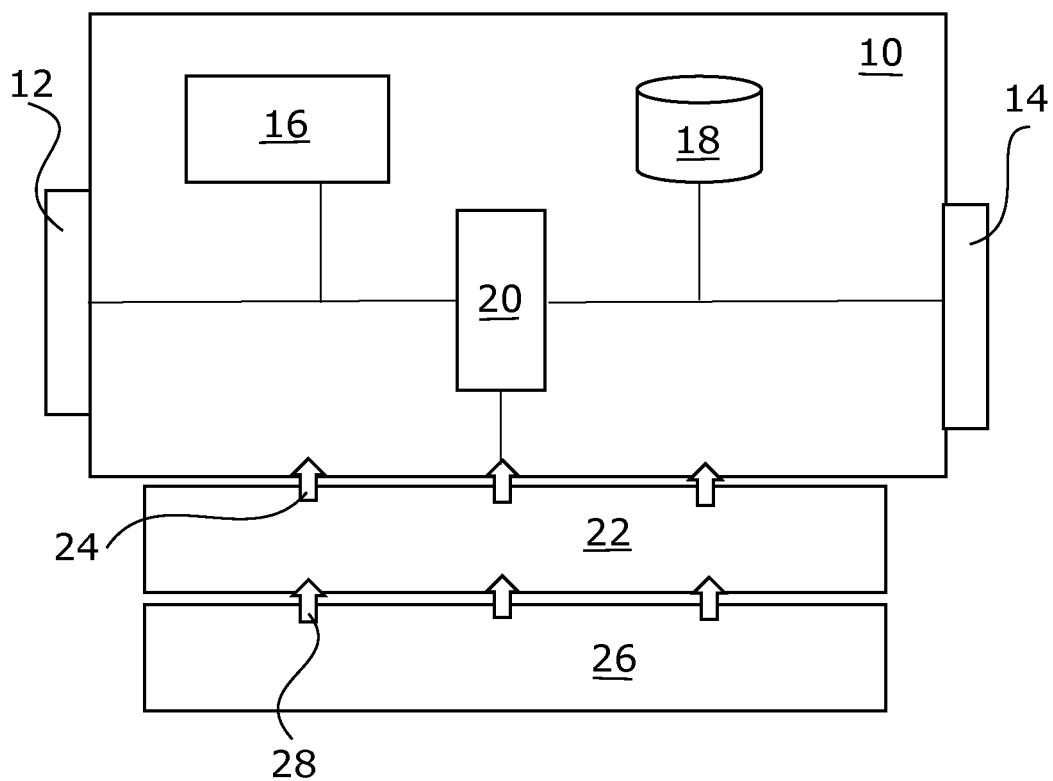

BATTERY POWERED WEARABLES

CROSS-REFERENCE TO RELATED APPLICATION

This application claims priority to United Kingdom Patent Application No. GB1904002.1, filed Mar. 22, 2019, hereby incorporated by reference in its entirety.

BACKGROUND

Wearable electronic devices can find particular use in situations where an operative (i.e. the wearer) is required to interact with a process, machinery, apparatus and/or related devices particularly "in the field" when the process, machinery, apparatus and/or related devices are in operation.

The use of wearable devices can serve to readily facilitate the ease, safety and efficiency with which an operative can interact and supply and/or retrieve data/information required in relation to the process, machinery, apparatus and/or devices. Such interaction can of course be conducted for a wide variety of purposes from commissioning, decommissioning, safety analysis, general monitoring and analysis and maintenance.

The "field" conditions in which the process, machinery, apparatus and/or devices are provided can be internal or external but quite often comprise hazardous environments requiring the use of intrinsically safe technology.

The usefulness of wearable devices have within such hazardous environments is limited by their power requirements and, in particular, limited by useful battery life. While wearable devices can therefore offer many advantages for use in hazardous environments, the limitations imposed by battery life severely serve to diminish and restrict such advantages thereby preventing wearable devices achieving their full potential.

SUMMARY

The present invention seeks to provide for a wearable electronic device capable of use within a hazardous environment and offering improved power supply capability.

According to one aspect of the present invention, there is provided an intrinsically safe powered wearable device including a power source connector for physical and electrical connection and disconnection for replacement of the power source on the device in a hot-pluggable manner.

The provision of a "hot pluggable", and including a possibly "hot swappable" power supply advantageously extends the operational lifetime of the wearable device within a hazardous environment. The power supply, and most commonly comprising a battery pack, can then be replaced in situ within the hazardous environment.

Advantageously, the power supply replacement can be achieved in a hot pluggable manner such that no disabling or "power-down" of the electronic device is required.

Preferably, the power source is mounted directly on the wearable device.

Also, and in particular for example for larger batteries, the invention can be arranged such that each the power source is mounted, preferably independently, elsewhere on the wearable device, or indeed elsewhere on the user, whether by way of a separate holder, e.g holster/sling/strap or otherwise.

Advantageously, the wearable device is arranged for both physical and electrical connection of the power source to the wearable device.

In a particular advantage, one in the same coupling means is arranged to provide for said physical and electrical connection.

Preferably, the power supply comprises at least two releasably interconnected battery packs. The interconnection can be for purposes of electrical and/or mechanical connection/mounting as required.

The battery packs can advantageously be directly connectable onto each other to achieve particularly space efficient storage and swapped usage of the battery packs. Again the direct connection can be just for electrical purposes and/or mechanical coupling purposes. If required, the plurality of power packs could be arranged to be mutually coupled, for example in a piggy-back or stackable manner, or separately coupled to the wearable device in a side-by-side configuration. Such configuration could however still allow for electrical connection between the power packs.

In particular, the wearable device can comprise a head-mountable device such as eyewear.

For example, the eyewear can comprise any one or more of a pair of glasses, goggles or a visor.

Advantageously, the wearable device has no requirement for voltage enhancing.

The battery is advantageously arranged not only to deliver the power required for the demands of the wearable device, while limiting the power to non-incendive limits suitable for use in Zone 1 hazardous areas to allow hot swapping, but importantly also to include functionality which allows the wearable device to monitor the charge status of the battery pack and present this information to the user through the device.

Further, the wearable device has no requirement for energy storage.

Preferably, the wearable devices arranged for swapping at least a pair of power packs between storage and usage modes.

As can therefore be appreciated, the present invention is particularly useful insofar as, through its ability to achieve "hot swapping" of the power packs, the power supply lifetime to a wearable device within a hazardous environment can be readily and advantageously extended.

This, further assists in usefully extending the operational lifetime of the wearable device within the hazardous environment, which of course can prove particularly beneficial when activities/investigations within such environments can be time critical.

The invention as described further hereinafter, by way of example only, with reference to the accompanying drawing which comprises a schematic representation of an intrinsically safe wearable device according to an embodiment of the present invention.

BRIEF DESCRIPTION OF THE DRAWING

FIGURE is a schematic illustration of a wearable device of the present disclosure.

DETAILED DESCRIPTION

As illustrated, and intrinsically safe wearable device 10 according to an embodiment of the present invention is shown located within a hazardous "Zone 1" environment.

Such an environment places particular restrictions and control on the manner of operation of the device 10 and, in particular, the likelihood of potential ignition sparks arising. For this reason, the wearable device 10 is provided with no voltage enhancing features, and no energy storage features.

In the illustrated example, the wearable device 10 is arranged for device inspection within the zone 1 hazardous area and, for this purpose, includes an input module 12 for receiving and/or retrieving data from advice under inspection, an output module 14 for the output of data and/or information to the wearer in response to that received at the input module 12. As one example, the output module 14 can comprise display functionality for the display of data to the wearer.

Though only illustrated schematically, it should be appreciated that one particular form of wearable device embodying the present invention can comprise a head-mounted device such as a pair of glasses, goggles or a visor.

The wearable device 10 includes processing functionality 16 and storage functionality 18 arranged to provide grant as required record, the above-mentioned data receipt/processing/display as required.

To support the power requirements of the wearable device 10 and its component parts, the device further includes a power supply module 20 arranged to deliver power in an intrinsically safe manner to each of the input and output modules 12, 14, the processing function 16 and storage function 18.

The power supply module 20 receives its power from a battery pack 22 employing a plug connection 24 for both mechanical and electrical connection of the battery pack 22 to the wearable device 10.

Yet further, and in accordance with the present invention, there is provided a swappable second battery pack 26 which, in illustrated embodiment, is arranged for plug connection 28 in a piggyback fashion onto the battery pack 22.

The manner of mechanical and/or electrical connection can however be achieved in any appropriate manner, not comprising piggybacking or stackable characteristics, with, for example each battery pack mounted independently to the wearable device, or indeed another holder worn by the user, and with or without electrical connection between each battery pack.

According to the advantages of the present invention, it is required that, when the battery pack 22 is approaching a condition at which it can no longer usefully power the wearable device 10, the battery packs 22, 26 can effectively be "swapped out" such that the battery pack 26 connects directly to the wearable device 10, and the then exhausted battery pack 22 piggybacks onto battery pack 26 in a reverse relationship that illustrated in the FIGURE.

The battery pack 26 then serves as a replacement for the battery pack 22 says to maintain power supplied to the wearable device 10.

Such swapping between the battery packs 22, 26 when required can readily be achieved in a "hot swappable" manner which proves particularly advantageous for the ongoing operation of the wearable device 10, but further does not create any potential problems with regard to the intrinsic safety requirements for the operation of the wearable device 10.

Such intrinsically safe requirements can be maintained through the nature of the "hot plug ability" which avoids the need to disable/powerdown the wearable device 10 at the time of changing over the battery packs.

The common features of connectivity of both battery packs to the wearable device 10, and the piggybacking features of mutual plug ability between the two battery packs serves to extend the powered lifetime of the wearable device 10 in a particularly ergonomic and space-efficient manner.

Of course, the invention is not restricted to the specific schematic details of the company FIGURE and the "hot swappable" power packs can be used/stored in any required configurations whether or not requiring storage connection to each other, or to the body of the wearable device 10.

What is claimed is:

1. An intrinsically safe powered wearable device including a power source connector for physical and electrical connection and disconnection with a power source for replacement of the power source on the device in a hot-pluggable manner, wherein the wearable device is configured for swapping first and second power packs between storage and usage modes, and wherein the first power pack is mountable directly to the second power pack.

2. A device as claimed in claim 1, wherein the wearable device is configured to mount the power source directly on the wearable device.

3. A device as claimed in claim 1, wherein the wearable device is configured for both direct physical and electrical connection of the power source to the wearable device.

4. A device as claimed in claim 1, wherein the wearable device includes a plug connection to provide for said physical and electrical connection.

5. A device as claimed in claim 1 in combination with the power source, wherein the power source comprises at least two releasably connected battery packs.

6. A device as claimed in claim 5, wherein the battery packs are directly mutually connectable.

7. A device as claimed in claim 6, wherein the battery packs are connectable onto each other.

8. A device as claimed in claim 1, wherein the wearable device is a head-mountable wearable device.

9. A device as claimed in claim 8, wherein the head-mountable wearable device comprises eyewear in the form of any one of glasses, goggles or a visor.

10. A device as claimed in claim 1, wherein the wearable device has no requirement for voltage enhancing.

11. A device as claimed in claim 1, wherein the wearable device has no requirement for energy storage.

12. An intrinsically safe powered wearable device including a power source connector for physical and electrical connection and disconnection with a power source for replacement of the power source on the device in a hot-pluggable manner, in combination with the power source, wherein the power source comprises at least two releasably connected battery packs, wherein the battery packs are directly mutually connectable and configured for swapping between storage and usage modes.

13. A device as claimed in claim 12, wherein the battery packs are connectable onto each other.

\* \* \* \* \*